(12) United States Patent
Kawamoto et al.

(10) Patent No.: US 11,110,547 B2
(45) Date of Patent: Sep. 7, 2021

(54) LASER WELDING METHOD

(71) Applicant: Panasonic Intellectual Property Management Co., Ltd., Osaka (JP)

(72) Inventors: Atsuhiro Kawamoto, Hyogo (JP); Yasushi Mukai, Osaka (JP); Junji Fujiwara, Osaka (JP); Tatsuyuki Nakagawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 757 days.

(21) Appl. No.: 15/109,936

(22) PCT Filed: Dec. 18, 2014

(86) PCT No.: PCT/JP2014/006316
§ 371 (c)(1),
(2) Date: Jul. 6, 2016

(87) PCT Pub. No.: WO2015/104762
PCT Pub. Date: Jul. 16, 2015

(65) Prior Publication Data
US 2016/0332257 A1    Nov. 17, 2016

(30) Foreign Application Priority Data

Jan. 8, 2014  (JP) .............................. JP2014-001322

(51) Int. Cl.
*B23K 26/244*  (2014.01)
*B23K 26/082*  (2014.01)

(52) U.S. Cl.
CPC .......... *B23K 26/244* (2015.10); *B23K 26/082* (2015.10)

(58) Field of Classification Search
CPC ......... B23K 26/24; B23K 33/00; B23K 26/08
(Continued)

(56) References Cited

U.S. PATENT DOCUMENTS 4,866,242 A  *  9/1989  Martyr ................. B23K 26/123
                                              219/121.64
5,603,853 A     2/1997  Mombo-Caristan
(Continued)

FOREIGN PATENT DOCUMENTS

DE     44 02 345        5/1995
DE      4402345    *    5/1995
(Continued)

OTHER PUBLICATIONS

Extended European Search Report dated Dec. 16, 2016 in corresponding European Application No. 14878183.4.
(Continued)

*Primary Examiner* — Dana Ross
*Assistant Examiner* — Joseph W Iskra
(74) *Attorney, Agent, or Firm* — Wenderoth, Lind & Ponack, L.L.P.

(57) ABSTRACT

A laser welding method according to the present disclosure includes a coupling forming step and a welding step. In the coupling forming step, a T coupling is formed by superimposing a side surface of a first member and a lower surface of a second member on each other. In the welding step, an upper surface of the second member opposite to the lower surface is irradiated with a laser beam so that the first member and the second member are welded to each other by the laser beam. Moreover, in the welding step, the laser beam is moved in a direction along the side surface of the first member while being weaved.

4 Claims, 4 Drawing Sheets

(58) Field of Classification Search
USPC .............. 219/121.63, 121.64, 121.78, 121.79
See application file for complete search history.

(56) References Cited

U.S. PATENT DOCUMENTS

| | | | | |
|---|---|---|---|---|
| 6,052,424 | A * | 4/2000 | Koizumi | G21B 1/25 219/121.14 |
| 2005/0061786 | A1 * | 3/2005 | Saito | B23K 15/0053 219/121.64 |
| 2006/0163221 | A1 * | 7/2006 | Makase | B23K 26/08 219/121.64 |
| 2006/0255019 | A1 * | 11/2006 | Martukanitz | B23K 26/0648 219/121.64 |
| 2007/0228777 | A1 * | 10/2007 | Mollick | B62D 25/06 296/210 |
| 2008/0206586 | A1 | 8/2008 | Imanaga et al. | |
| 2011/0139753 | A1 | 6/2011 | Lee et al. | |
| 2012/0255937 | A1 | 10/2012 | Oe et al. | |
| 2012/0272611 | A1 * | 11/2012 | Tsukimoto | B23K 9/044 52/741.1 |
| 2013/0078099 | A1 | 3/2013 | Ahn | |
| 2014/0124486 | A1 * | 5/2014 | Devers | B23K 26/0884 219/121.45 |
| 2014/0339203 | A1 * | 11/2014 | Peters | B23K 9/04 219/76.14 |

FOREIGN PATENT DOCUMENTS

| | | | |
|---|---|---|---|
| DE | 102 31 784 | | 10/2004 |
| DE | 10 2007 038 502 | | 2/2009 |
| JP | 63-188036 | | 8/1988 |
| JP | 63-203286 | | 8/1988 |
| JP | 01321084 | A * | 12/1989 ............ B23K 26/22 |
| JP | 10-328861 | | 12/1998 |
| JP | 2003-200852 | | 7/2003 |
| JP | 2003-251484 | | 9/2003 |
| JP | 2008-55952 | | 3/2008 |
| JP | 2008-194730 | | 8/2008 |
| JP | 2008-238265 | | 10/2008 |
| JP | 2009-220179 | | 10/2009 |
| JP | 2011-125928 | | 6/2011 |
| JP | 2011-147952 | | 8/2011 |
| JP | 2012-218030 | | 11/2012 |
| JP | 2013-220462 | | 10/2013 |

OTHER PUBLICATIONS

International Search Report dated Mar. 10, 2015 in corresponding International Application No. PCT/JP2014/006316.
English Translation of Chinese Search Report dated Jun. 19, 2017 for the related Chinese Patent Application No. 201480072300.9.
Indian Examination Report dated Nov. 21, 2019 for the corresponding Indian Patent Application No. 201647023193.

* cited by examiner

FIG. 3

| WEAVING WIDTH (mm) | SPOT DIAMETER (mm) | DEVIATION BETWEEN CENTERS (mm) | WEAVING WIDTH / 4 + SPOT DIAMETER | WELDING RESULTS |
|---|---|---|---|---|
| 0 | 0.6 | 0 | 0.6 | ○ |
| " | " | 0.3 | 0.6 | ○ |
| " | " | 0.4 | 0.6 | × (BURNING-THROUGH) |
| 0.3 | 0.4 | 0 | 0.7 | ○ |
| " | " | 0.3 | 0.7 | ○ |
| " | " | 0.6 | 0.7 | ○ |
| " | " | 0.8 | 0.7 | ○ |
| " | " | 0.9 | 0.7 | × (BURNING-THROUGH) |
| 1.0 | 0.6 | 0 | 1.6 | ○ |
| " | " | 0.3 | 1.6 | ○ |
| " | " | 0.6 | 1.6 | ○ |
| " | " | 0.8 | 1.6 | ○ |
| " | " | 0.9 | 1.6 | × (BURNING-THROUGH) |
| 1.5 | 0.8 | 0 | 2.3 | ○ |
| " | " | 0.3 | 2.3 | ○ |
| " | " | 0.6 | 2.3 | ○ |
| " | " | 0.8 | 2.3 | ○ |
| " | " | 0.9 | 2.3 | × (INSUFFICIENT PENETRATION) |
| 1.5 | 1.0 | 0 | 2.5 | × (INSUFFICIENT PENETRATION) |

LASER WELDING METHOD

This application is a U.S. national stage application of the PCT international application No. PCT/JP2014/006316.

TECHNICAL FIELD

The present disclosure relates to laser welding for irradiating two workpieces with a laser beam so as to weld the two workpieces to each other and, more particularly, to a laser welding method, in which tolerance with respect to the positional deviation of a laser beam or a gap between two workpieces is enhanced.

BACKGROUND ART

A conventional laser welding method disclosed in PTL 1 will be described with reference to FIG. 4.

In the conventional laser welding method, as shown in FIG. 4, upper plate 101 having projection 102 at a lower surface thereof and lower plate 103 having recess 104 at a side surface thereof are superimposed on each other in such a manner as to form a T coupling, followed by laser welding. At this time, upper plate 101 and lower plate 103 are superimposed on each other in such a manner as to insert projection 102 of upper plate 101 into recess 104 of lower plate 103. Laser beam 105 is radiated from an upper surface side of upper plate 101 in such a manner as to pass upper plate 101. In this manner, molten metal reaches lower plate 103 through upper plate 101, so that upper plate 101 and lower plate 103 can be welded to each other at welded portion 106.

Moreover, lower plate 103 has recess 104, and therefore, the molten metal is received in recess 104 even with a gap defined between upper plate 101 and lower plate 103, and thus, the molten metal cannot flow outward. Consequently, upper plate 101 and lower plate 103 can be securely welded to each other.

CITATION LIST

Patent Literature

PL1: Unexamined Japanese Patent Publication No. S63-203286

SUMMARY OF THE INVENTION

However, if laser beam 105 is positionally deviated in the conventional laser welding method, lower plate 103 cannot be irradiated with laser beam 105, whereby upper plate 101 is burned through. Moreover, projection 102 needs to be formed at the lower surface of upper plate 101, and furthermore, recess 104 needs to be formed at the side surface of lower plate 103. Additionally, lower plate 103 needs to be thick enough to form recess 104. As a consequence, man-hours for forming projection 102 and recess 104 are required, and additionally, the thickness of lower plate 103 is restrained. The present disclosure relates to a laser welding method for irradiating a surface opposite to a surface abutting against a T coupling with a laser beam, followed by welding, and provides a laser welding method, in which tolerance with respect to the positional deviation of a laser beam is enhanced.

In order to solve the above-described problem, the laser welding method of the present disclosure includes a coupling forming step and a welding step. In the coupling forming step, a T coupling is formed by superimposing a side surface of a first member and a lower surface of a second member on each other. In the welding step, an upper surface of the second member opposite to the lower surface is irradiated with a laser beam so that the first member and the second member are welded to each other by the laser beam. Moreover, in the welding step, the laser beam is moved in a direction along the side surface of the first member while being weaved.

According to the present disclosure, the second member is irradiated with the laser beam that is weaved, so that penetration can be made shallow and a bead width can be made large, and therefore, the tolerance with respect to a target positional deviation can be improved.

BRIEF DESCRIPTION OF DRAWINGS

FIG. 3 is a table illustrating the results of welding in various welding parameters in the exemplary embodiment of the present disclosure.

DESCRIPTION OF EMBODIMENT

Exemplary Embodiment

Figure 1A:
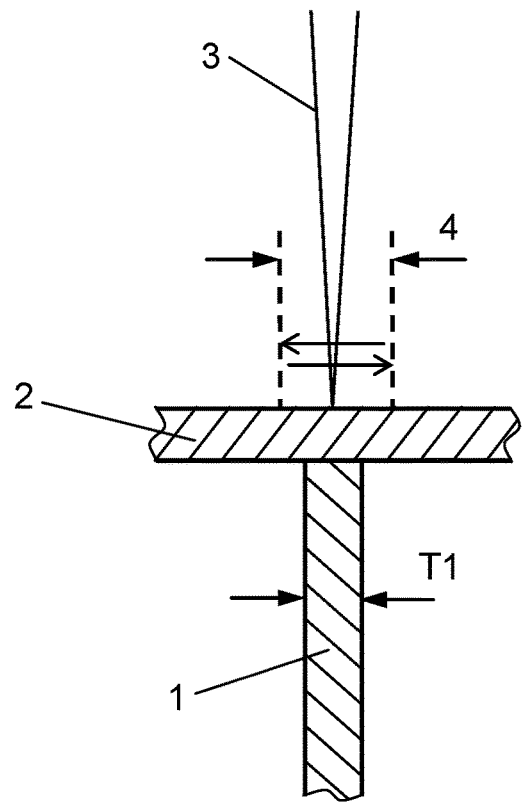
FIG. 1A is a cross-sectional view showing a state of a laser welding method in an exemplary embodiment of the present disclosure.
Figure 1B:
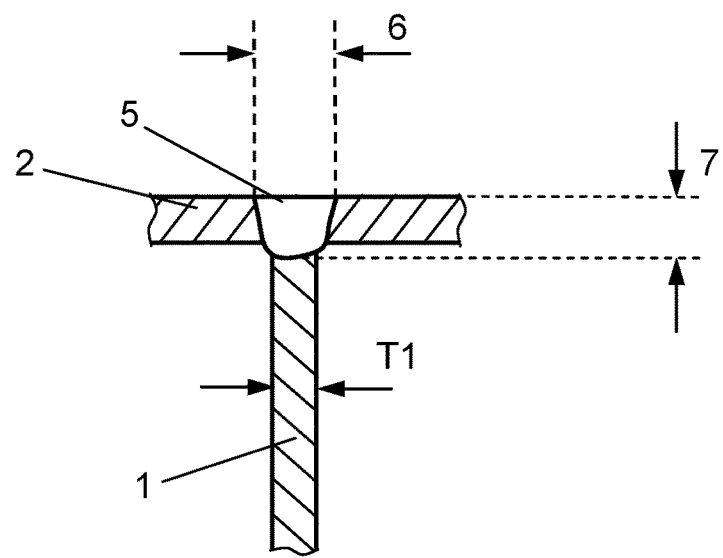
FIG. 1B is a cross-sectional view showing a state after laser welding in the exemplary embodiment of the present disclosure.
Figure 2A:
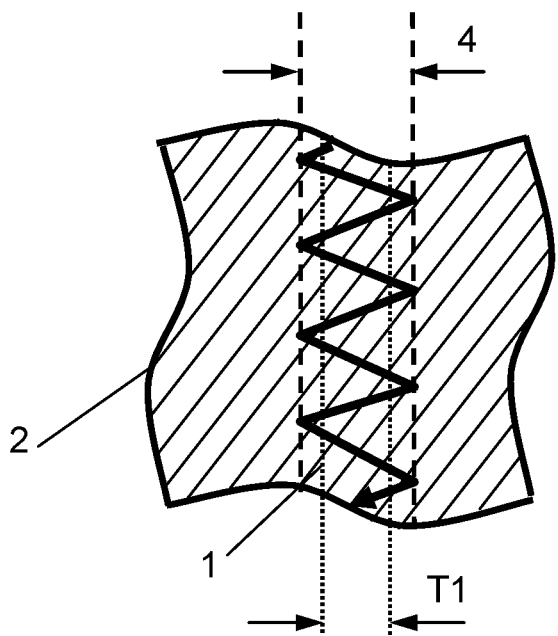
FIG. 2A is a plan view showing zigzag weaving in the exemplary embodiment of the present disclosure.
Figure 2B:
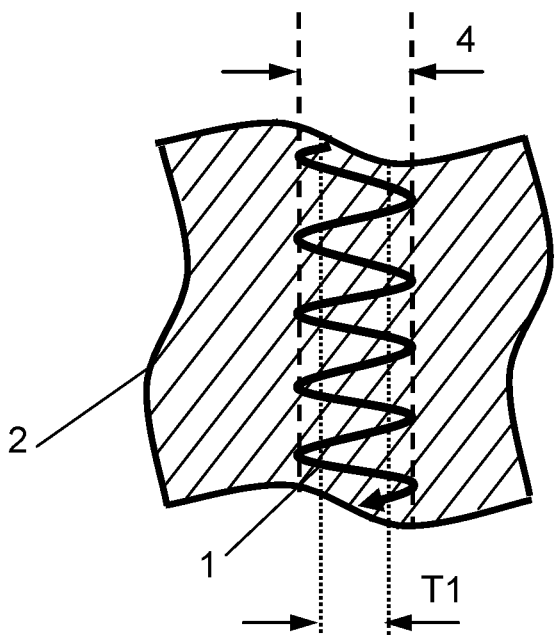
FIG. 2B is a plan view showing wavy weaving in the exemplary embodiment of the present disclosure.
Figure 2C:
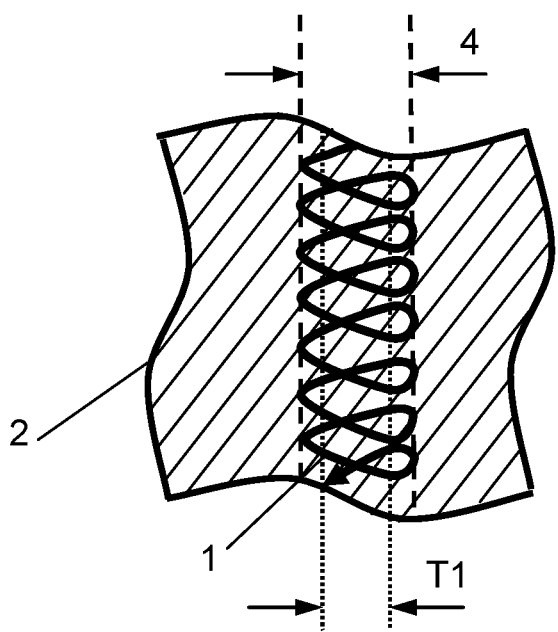
FIG. 2C is a plan view showing spiral weaving in the exemplary embodiment of the present disclosure.

A laser welding method in the present exemplary embodiment will be described with reference to FIG. 1A to FIG. 3. FIG. 1A is a cross-sectional view showing the state of a laser welding method in the present exemplary embodiment. FIG. 1B is a cross-sectional view showing a state after laser welding in the present exemplary embodiment. FIG. 2A is a plan view showing zigzag weaving in the present exemplary embodiment. FIG. 2B is a plan view showing wavy weaving in the present exemplary embodiment. FIG. 2C is a plan view showing spiral weaving in the present exemplary embodiment. FIG. 3 is a table illustrating the results of welding in various welding parameters in the present exemplary embodiment.

As shown in FIG. 1A, the laser welding method in the present exemplary embodiment is designed to weld a T coupling obtained by allowing the side surface of first plate 1 (i.e., a first member) having thickness T1 to abut against the lower surface of second plate 2 (i.e., a second member). The surface (i.e., the upper surface) of second plate 2 opposite to the surface abutting against first plate 1 is irradiated with laser beam 3. Incidentally, in FIG. 1A, laser beam 3 is radiated in a direction perpendicular to the upper surface of second plate 2. Laser beam 3 is moved in a direction in which the side surface of first plate 1 extends (i.e., a direction perpendicular to the sheet), followed by welding while weaving laser beam 3 in such a manner as to achieve weaving width 4. In this manner, molten portion 5 having bead width 6 and penetration depth 7 is formed, as shown in FIG. 1B, so that first plate 1 and second plate 2 are welded to each other. At this time, FIG. 1A shows an example in which laser beam 3 is moved in the direction perpendicular to the sheet while being weaved laterally on the sheet.

Here, weaving width 4 is a width in which the center of a spot of laser beam 3 weaves. Moreover, the diameter of the spot of laser beam 3 is referred to as a "spot diameter."

Figure 4:
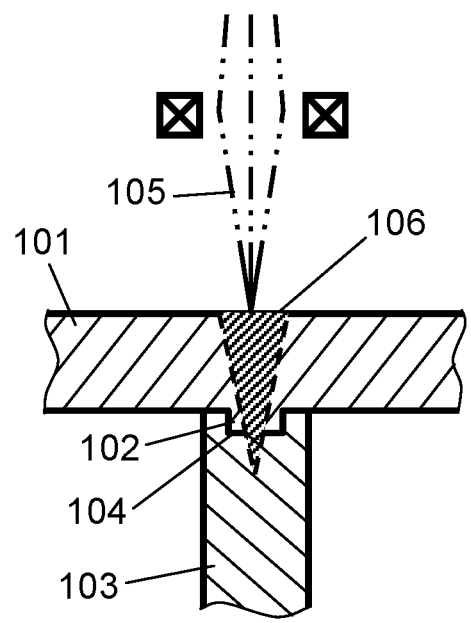
FIG. 4 is a cross-sectional view showing a conventional laser welding method.

In this manner, bead width 6 of molten portion 5 is enlarged in the case where laser beam 3 is weaved during laser welding compared to the case where laser beam 3 is not weaved, as shown in FIG. 1B. In addition, the irradiation area of laser beam 3 is increased so as to reduce the intrusion of heat per unit area, thus reducing penetration depth 7 of molten portion 5. Consequently, in comparison with the conventional technique without weaving (see FIG. 4), penetration depth 7 of molten portion 5 becomes small and bead width 6 of molten portion 5 becomes large, thereby enhancing the tolerance with respect to the positional deviation of laser beam 3. Moreover, since bead width 6 of molten portion 5 becomes large, the amount of molten metal is increased so as to fill a gap between first plate 1 and second plate 2, thus enhancing the tolerance with respect to the gap as well.

Next, description will be given of the shape of weaving with reference to FIGS. 2A to 2C. As shown in FIG. 2A, when laser beam 3 is moved in an advance direction at a constant speed, and, laser beam 3 is reciprocated in a direction perpendicular to the advance direction at a constant speed, zigzag weaving by straight lines can be attained. Alternatively, as shown in FIG. 2B, when laser beam 3 is moved in the advance direction at a constant speed, and, laser beam 3 is reciprocated in the direction perpendicular to the advance direction in such a manner that laser beam 3 decelerates at the end of weaving width 4, wavy weaving by curves can be attained. Alternatively, as shown in FIG. 2C, when laser beam 3 is moved in the advance direction at a constant speed, and, laser beam 3 is rotated, spiral weaving by curves can be attained. Although FIGS. 2A to 2C show examples in which weaving width 4 is larger than thickness T1 of first plate 1, weaving width 4 may be equal to or smaller than thickness T1 of first plate 1.

Incidentally, penetration depth 7 and bead width 6 of molten portion 5 are influenced by weaving width 4 or the spot diameter of a tip of laser beam 3. In other words, the greater weaving width 4 is or the greater the spot diameter is, the more the irradiation range of laser beam 3 becomes. Consequently, bead width 6 of molten portion 5 is increased, the intrusion of heat into second plate 2 is reduced, and penetration depth 7 of molten portion 5 becomes small. With reference to FIG. 3, description will be given of the results of welding based on the spot diameter of laser beam 3, weaving width 4, and a deviation between the center of weaving width 4 and the center of the side surface of first plate 1.

FIG. 3 is a table illustrating the welding results obtained by variously changing weaving width 4 of laser beam 3, the spot diameter of laser beam 3, and a deviation between the center of weaving width 4 and the center of the side surface of first plate 1. In FIG. 3, weaving width 4 of laser beam 3 and the spot diameter are added to obtain the sum. Since weaving width 4 of laser beam 3 is a weaving width at the center of the spot of laser beam 3, the sum of weaving width 4 of laser beam 3 and the spot diameter indicates a width of the irradiation range of laser beam 3. Here, all of the welding results illustrated in FIG. 3 are obtained by setting thickness T1 of first plate 1 to 1.6 mm, a thickness of second plate 2 to 1.6 mm, a welding speed (i.e., a speed of laser beam 3 that is moved in a direction of the side surface of first plate 1) to 1.0 m/min., and a laser output to 2 kW.

First, description will be given of the conventional technique in which weaving width 4 is 0 mm, that is, no weaving is performed. In the case where no weaving is performed (i.e., a weaving width of 0 mm) and the spot diameter is 0.6 mm during welding, favorable welding results are obtained when the deviations of laser beam 3 from the center of the side surface of first plate 1 are 0.0 mm and 0.3 mm. However, when the deviation of laser beam 3 from the center of the side surface of first plate 1 is 0.4 mm, burning-through occurred at second plate 2. Since thickness T1 of first plate 1 is 1.6 mm, burning-through occurred although first plate 1 is irradiated with laser beam 3. This is because laser beam 3 is not weaved so that laser beam 3 excessively melted first plate 1.

Subsequently, in the case where weaving width 4 is 0.3 mm and the spot diameter is 0.4 mm during welding, favorable welding results are obtained when the deviations of laser beam 3 from the center of the side surface of first plate 1 ranged from 0.0 mm to 0.8 mm. However, when the deviation of laser beam 3 from the center of the side surface of first plate 1 is 0.9 mm, burning-through occurred at second plate 2. Since thickness T1 of first plate 1 is 1.6 mm, laser beam 3 went out of first plate 1, and therefore, burning-through occurred. In other words, this shows that weaving laser beam 3 enables welding until the center of weaving of laser beam 3 reaches the end of first plate 1.

Next, in the case where weaving width 4 is 1.0 mm and the spot diameter is 0.6 mm during welding, favorable welding results are obtained when the deviations of laser beam 3 from the center of the side surface of first plate 1 ranged from 0.0 mm to 0.8 mm. However, when the deviation of laser beam 3 from the center of the side surface of first plate 1 is 0.9 mm, burning-through occurred at second plate 2. Similarly, since thickness T1 of first plate 1 is 1.6 mm, laser beam 3 went out of first plate 1, and therefore, burning-through occurred. In other words, this shows that weaving laser beam 3 enables welding until the center of weaving of laser beam 3 reaches the end of first plate 1.

Subsequently, in the case where weaving width 4 is 1.5 mm and the spot diameter is 0.8 mm during welding, favorable welding results are obtained when the deviations of laser beam 3 from the center of the side surface of first plate 1 ranged from 0.0 mm to 0.8 mm. However, when the deviation of laser beam 3 from the center of the side surface of first plate 1 is 0.9 mm, insufficient penetration occurred at second plate 2. In other words, although laser beam 3 went out of first plate 1, not burning-through but insufficient penetration occurred. This shows that first plate 1 can be melted and welded until the center of weaving of laser beam 3 reaches the end of first plate 1. Moreover, this shows that when the center of weaving of laser beam 3 goes out of the end of first plate 1, first plate 1 cannot be melted.

Finally, it is observed that in the case where weaving width 4 is 1.5 mm and the spot diameter is 1.0 mm during welding, insufficient penetration occurred even when the deviation of laser beam 3 from the center of the side surface of first plate 1 is 0.0 mm. This shows that the sum of weaving width 4 and the spot diameter becomes so large that penetration depth 7 of molten portion 5 becomes insufficient.

From the above-described results, it is found that when the sum of weaving width 4 and the spot diameter ranges from 0.7 mm to 2.3 mm, welding can be achieved even when the center of weaving deviates up to the end of first plate 1. Specifically, the deviation of the center of weaving is not allowed to be as small as 0.3 mm in the case of no weaving: in contrast, the deviation of the center of weaving is allowed to be up to 0.8 mm in the case of weaving. That is to say, it is found that weaving enhances the tolerance of the deviation of weaving of laser beam 3 more than two times. Moreover, since thickness T1 of first plate 1 is 1.6 mm, welding can be adequately performed in the case where the sum of weaving width 4 and the spot diameter is greater than 0.4 times thickness of the first plate (0.64 mm) and smaller than 1.5 times (2.4 mm).

Incidentally, in the case where the deviation from the center of the side surface of first plate 1 is excessive, favorable welding cannot be achieved even when the above-described relationship is established. In other words, when a deviation in excess of a half of the thickness of first plate 1 occurs, favorable welding cannot be achieved.

As described above, according to the laser welding method in the present exemplary embodiment, laser beam 3 is radiated while being weaved, and therefore, penetration 7 of molten portion 5 becomes small, and, bead width 6 of molten portion 5 becomes large. Consequently, it is possible to enhance tolerance with respect to the positional deviation of laser beam 3 from workpieces to be welded and a gap between the workpieces to be welded.

INDUSTRIAL APPLICABILITY

According to the present disclosure, it is possible to enhance the tolerance with respect to the positional deviation of the laser beam in welding a T coupling. Thus, the present disclosure is industrially usable as a laser welding method for laser-welding a T coupling.

The invention claimed is:

1. A laser welding method comprising:
   a coupling forming step of forming a T coupling that is obtained by superimposing a side surface of a first plate and a lower surface of a second plate on each other; and
   a welding step of irradiating an upper surface of the second plate opposite to the lower surface with a laser beam so as to laser-weld the first plate and the second plate to each other,
   wherein in the welding step, the laser beam is moved at constant speed in an advance direction as a direction along the side surface of the first plate, the laser beam is reciprocated in direction perpendicular to the advance direction and the laser beam is irradiated as the laser beam is moved in the advance direction while weaving in which the laser beam is irradiated as the laser beam is moved periodically at a constant speed and laterally to the advance direction,
   wherein a sum of a weaving width of the laser beam and a spot diameter of the laser beam is greater than 0.4 times and smaller than 1.5 times a thickness of the first plate, and
   wherein a deviation between a center of the side surface of the first plate and a center of the weaving width is not larger than half of the thickness of the first plate, the center of the side surface of the first plate being a center of the thickness of the first plate, the laser welding is performed so that a bead of the laser welding is allowed to protrude from an end of a width of the first plate.

2. The laser welding method according to claim 1,
   wherein the weaving of the laser beam is zigzag by straight lines, and
   wherein the zigzag by the straight lines is performed by manner in which the laser beam is moved in the advance direction at constant speed and is reciprocated at constant speed in direction perpendicular to the advance direction.

3. The laser welding method according to claim 1,
   wherein the weaving of the laser beam is wavy by curves, and
   wherein the wavy by the curves is performed by manner in which the laser beam is moved in the advance direction at constant speed and is reciprocated in direction perpendicular to the advance direction.

4. The laser welding method according to claim 1,
   wherein the weaving of the laser beam is spiral, and
   wherein the spiral is performed by manner in which the laser beam is moved in the advance direction at constant speed and is rotated.

* * * * *